April 28, 1970 J. J. REILLY, JR 3,509,354

OPTICAL, LABEL READ-OUT DEVICE

Filed June 29, 1967 2 Sheets-Sheet 1

JOHN J. REILLY, Jr.
INVENTOR.

BY

Townsend and Townsend

April 28, 1970 J. J. REILLY, JR 3,509,354

OPTICAL, LABEL READ-OUT DEVICE

Filed June 29, 1967 2 Sheets-Sheet 2

JOHN J. REILLY, Jr.
INVENTOR.

BY

Townsend and Townsend

United States Patent Office 3,509,354
Patented Apr. 28, 1970

3,509,354

OPTICAL, LABEL READ-OUT DEVICE

John J. Reilly, Jr., Orinda, Calif., assignor to Binary Systems, Inc., Orinda, Calif., a corporation of California Continuation-in-part of application Ser. No. 522,591, Jan. 24, 1966. This application June 29, 1967, Ser. No. 649,928
Int. Cl. G02b *5/14;* H01j *5/16*
U.S. Cl. 250—227 5 Claims

ABSTRACT OF THE DISCLOSURE

A read-out device having light pipe structure movable in scanning relationship across the face of a coded tag or other label on an article of merchandise for optically sensing the coded information thereon and for changing the information to a usable form. Light is directed through the light pipe structure and onto the label as the latter is scanned. Reflected light is returned to the light pipe structure which directs such light to photosensitive means for generating an electronic signal corresponding to the information on the label.

This is a continuation-in-part of my copending application, Ser. No. 522,591, entitled "Apparatus and a System for Inventory Control," filed Jan. 24, 1966.

This invention relates to improvements in information retrieval techniques and, more particularly, to an optical read-out device adapted to read coded indicia or other information imprinted on a price tag or other label affixed to an article of merchandise or the like.

In the aforesaid copending application, a system of invention control is described wherein article-identifying indicia on a label affixed to an article of merchandise can be sensed by a reading device placed over the label, and the sensed information can be directed to suitable equipment, such as a computer network, for storage or other uses. In this way, the status of the article can be immediately determined in relationship to other and similar articles yet to be disposed of, so that an inventory of the remaining articles is automatically obtained without resorting to conventional inventory-taking methods. If the system is applied at the point of sale of an article, not only will such system simplify inventory control, but also it will serve as an accounting tool as well so as to eliminate many time-consuming steps of conventional accounting techniques.

The present invention is directed to an improved reading device for use in the aforesaid system as a means of retrieving information from a price tag or label on an article of merchandise. To this end, the device is adapted to optically sense special indicia on a surface, such as the exposed face of a merchandising label and then to direct such sensed information to a photosensitive structure which changes light to an electronic signal.

A preferred embodiment of the device of the present invention is of a size and weight permitting it to be hand-held and to be moved onto a price tage or label affixed to an article of merchandise. This particular aspect of the device is not necessarily essential in that the device could be stationary and the article whose label is to be read could be brought to the device for the read-out operation. For optically sensing the information on a label, the device has a number of light pipes shiftably mounted for scanning a number of informational rows on the label. Light directed through the light pipes from a suitable light source will impinge on the label and be immediately reflected therefrom back into the light pipes as the latter scan the label. The amount of reflected light will be a function of the information applied to the label and suitable photosensitive means is provided for each light pipe to receive the reflected light and to change it into a characteristic electronic signal.

The primary object of this invention is, therefore, to provide an improved read-out device for optically reading coded or other information applied to a surface, whereby the device is adapted for use as a part of an inventory or accounting control system having a computer network or other storage facility whose input is provided by the output signal of the device.

Another object of the invention is to provide a readout device of the type described wherein a number of light pipes are mounted for movement in scanning relationship to a label on an article of merchandise so that the light directed through the light pipes can impinge on the label and be reflected back into the light pipes to photosensitive structure coupled thereto, all of which is accomplished during the scanning of the label, so that information on the label can be sensed and retrieved as a function of the light reflected from the label and returned to the light pipes.

A further object of this invention is to provide a device of the aforesaid character which is simple and rugged in construction, can be hand-held and requires no special skills on the part of the user, so that it can be positioned at the point of sale of an article to permit the recording of inventory and accounting information as soon as sales are made.

Other objects of this invention will become apparent as the following specification progresses, reference being had to the accompanying drawings for a description of a preferred embodiment of the invention.

Figures 1, 2, 3:
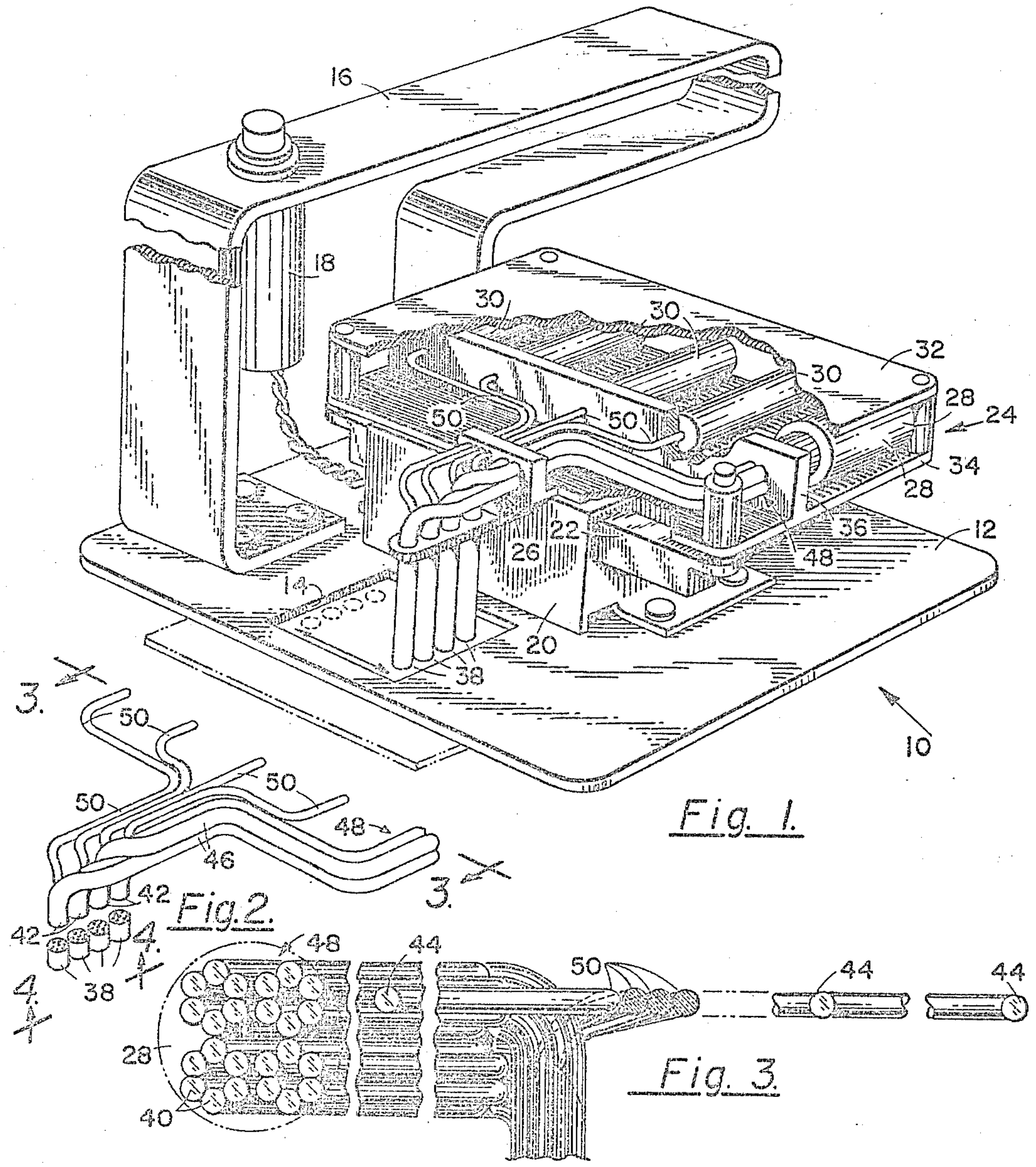
FIG. 1 is a perspective view of the read-out device of this invention.
FIG. 2 is a perspective view of the light pipe structure of the device.
FIG. 3 is a view looking in the direction of line 3—3 of FIG. 2.

A preferred embodiment of the read-out device is broadly denoted by the numeral 10 and includes a flat plate 12 having an opening 14 therethrough adjacent to one side edge thereof. A handle 16 is secured to and extends upwardly from the plate and has a push button electrical switch 18 mounted in a position to be actuated by the thumb of the user.

A reversible electric motor 20 is secured to the plate adjacent to opening 14 and has a reciprocal bar 22 thereon which moves in a plane substantially parallel to plate 12 when the motor is energized.

Mounting structure 24 is secured to bar 22 and disposed above motor 20 for reciprocation with the bar. Structure 24 provides a support for a light pipe assembly 26, a light source 28, and a number of phototransistors 30 in the manner shown in FIG. 1. For the purposes of the present invention, structure 24 may be of any configuration but, for purposes of illustration, it includes a pair of spaced upper and lower plates 32 and 34 having a partition 36 therebetween and extending longitudinally of bar 22. Lower plate 34 is rigidly secured to bar 22 so that the entire structure 24 and all of the components carried by it move with the bar when the motor is energized.

Figure 4:
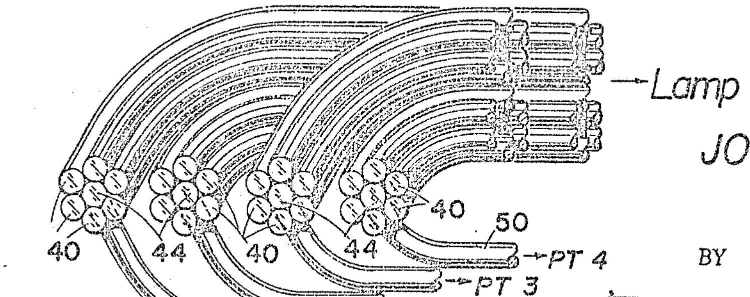
FIG. 4 is a view looking in the direction of line 4—4 of FIG. 2.

Light pipe assembly 26 includes a light pipe unit 38 for each phototransistor 30, respectively. Each unit 38 includes a bundle of light pipes 40 which are clustered to form a generally ring-like configuration in the manner shown in FIGS. 3 and 4. Light pipes 40 of each bundle form a relatively straight stretch 42 which extends upwardly from a location adjacent to opening 14 as shown in FIG. 1. Light pipes 40 in stretch 42 surround a central light pipe 44, the latter having a lower end terminating in substantially the same plane as the lower ends of the light pipes 40 of the corresponding bundle. The lower ends of light pipes 40 and 44 are directly adjacent to one side of opening 14 when bar 22 is at one end of its path of travel. The travel of the bar is selected so that the lower ends of the aforesaid light pipes move across opening 14 to the opposite side thereof. Stretches 42 are fixed relative to structure 24 so that the lower ends of the light pipes effectively scan opening 14 as bar 22 is reciprocated.

The upper stretch 46 of each bundle of light pipes 40 extends laterally and along a serpentine path from the upper end of the corresponding stretch 42. Stretches 46 converge to form a relatively unitary bundle broadly denoted by the numeral 48 which extends through partition 36 and is coupled to light source 28. Thus, light can be directed into and through light pipes 40, whereby the light will issue from the lower ends of such light pipes for impingement on a surface aligned with opening 14.

Each light pipe 44 has an upper stretch 50 which extends essentially in the same plane as bundle 48. Stretches 50 extend through partition 36 and are coupled to respective phototransistors 30.

Figure 7:
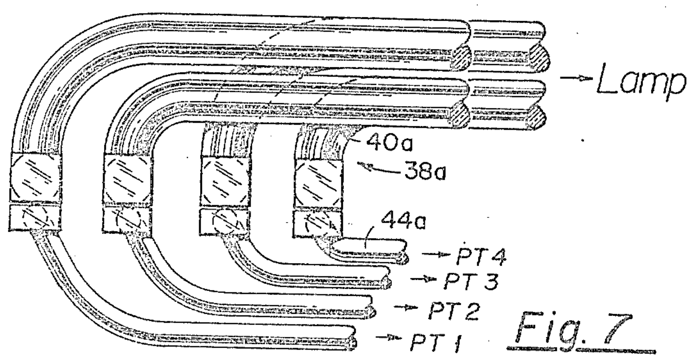
FIG. 7 is a view similar to FIG. 4 but illustrating another embodiment of the light pipe structure.

An alternate form of light pipe unit is broadly denoted by the numeral 38*a* and is shown in FIG. 7. Unit 38*a* includes a first light pipe 40*a* having one end coupled with source 28 and an opposite end provided with a flat polygonal face. A second light pipe 44*a* is coupled at one of its ends to a respective phototransistor 30 and has a flat polygonal face at its opposite end, the flat end faces of the light pipes being substantially coplanar and movable in scanning relationship to opening 14 when the corresponding unit 38*a* is mounted in the manner shown in FIG. 1 for scanning opening 14.

Figure 5:
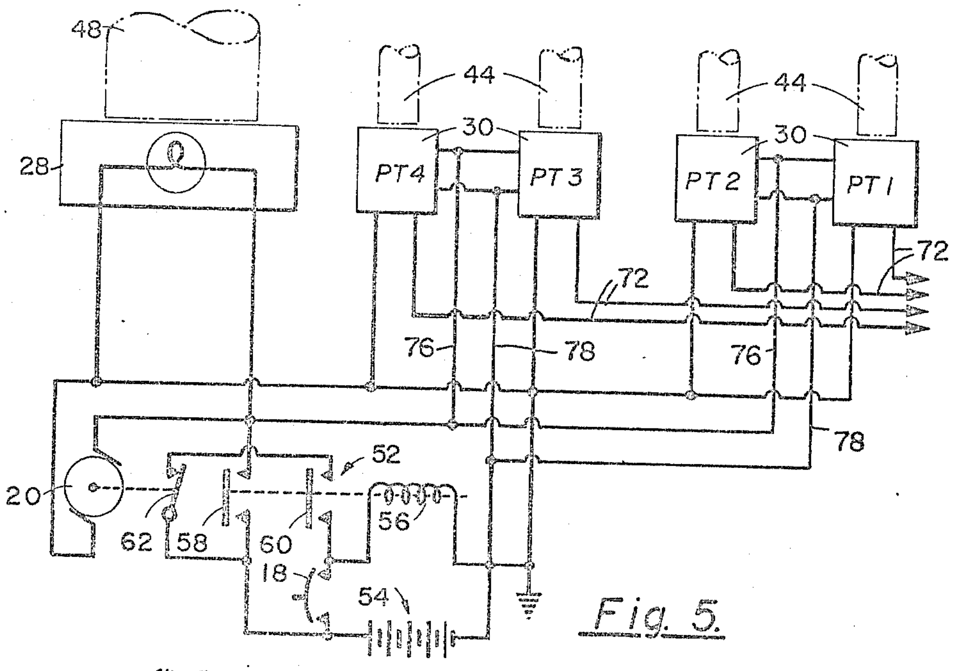
FIG. 5 is a schematic view of the electrical circuitry of the device.

The circuitry for device 10 is illustrated in FIG. 5 wherein motor 20 and light source 28 are coupled by means of a relay 52 to an electrical power source 54 such as a battery carried in any suitable manner on plate 12. Push button switch 18 couples the coil 56 of relay 52 to battery 54 so that, when switch 18 is closed, coil 56 is energized to close switches 58 and 60 thereof. Switch 58 energizes motor 20 and light sources 28 and switch 60 provides, through a limit switch 62, a holding circuit which includes battery 54 and coil 56. Thus, motor 20 and light source 28 remain energized even though switch 18 is opened. Switch 62 is positioned adjacent to bar 22 so that it will close as the bar commences to move under the influence of motor 20. On the return of the bar to its initial position following a complete cycle of operations, switch 62 is opened, thus, breaking the holding circuit of relay 52 and thereby deenergizing motor 20 and light source 28.

Figure 6:
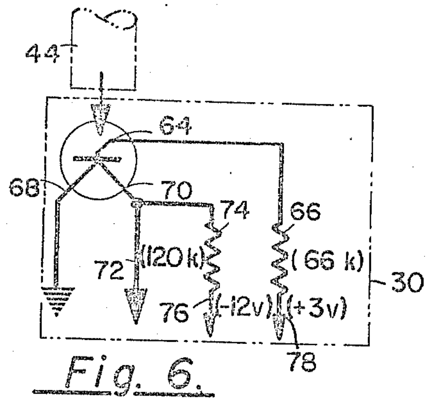
FIG. 6 is a schematic view of the photosensitive element provided for each light pipe, respectively.

Each phototransistor 30 is of the type shown schematically in FIG. 6 wherein a base electrode 64 is provided with a bias voltage by means of a resistor 66 coupled in a manner to be described. The emitter electrode 68 is connected to ground and the collector electrode 70 is provided with a lead 72 for connecting the same to other equipment. Electrode 70 is also biased by means of a resistor 74, resistor 66 and 74 being coupled by leads 76 and 78 in the circuit of FIG. 5 in series with switch 58. Thus, when this switch is closed, current will flow through the resistors to provide the requisite bias voltages. FIG. 5 also illustrates that the leads coupled to the emitter electrodes 68 of phototransistors 30 are coupled to the negative side of battery 54.

OPERATION

While device 10 is adapted for a number of different uses, it is especially adapted to be used with a price tag or label having a configuration substantially complemental to opening 14. To this end, the label is preferably received complementarily in the opening by placing plate 12 over the label and on the article of merchandise to which the label is attached. The label will have been printed or otherwise provided with suitable indicia in rows corresponding to light pipe units 38. Each row will contain marks or other indicating means whose light reflectivities will correspond to the information to be used for merchandising the article, such as the article number, the price, and the department from which the article is sold.

After the user of the device places it on the article whose label is to be read, the label will be aligned with the opening and the informational rows on the label will be aligned with the paths of travel of respective light pipe units 38. The user then presses push button switch 18 which energizes relay 52 to close switches 58 and 60, whereupon the motor is energized and bar 22 commences to move toward the opposite end of its path of travel. This action closes switch 62 and causes light pipe units 38 to scan the informational rows on the label aligned with opening 14. Even if switch 18 is released, the bar and thereby the light pipes will make one complete scan across the opening.

Light source 40, energized when switch 58 is closed, directs light through light pipes 40 and on to the label, whereupon light is reflected from the label into light pipes 44 and the reflected light travels through these light pipes to respective phototransistors. This action occurs as the label is scanned and the variations in the light reflectivities are represented by the light reflected into light pipes 44 and directed to respective phototransistors 30. Thus, such variations provide an indication of the information on the label, the function of the phototransistors being to transform light into electronic signals corresponding to the information sensed in the form of reflected light.

After bar 22 has returned to its starting position, it opens switch 62 which breaks the circuit of coil 56, whereupon switches 58 and 60 are opened and motor 20 and light source 28 are deenergized. Also, the circuits connecting battery 54 with the phototransistors are opened and no current goes through the battery. The device is then ready for reading the information on another label. The outputs of phototransistors 30 are adapted for providing the input signals to a computer network or the like wherein the information sensed by device 10 can be stored or used to actuate other equipment. The size and configuration of device 10 make it suitable for use at the point of sale of an article and then the device can be used even by unskilled clerks with a minimum of instruction. The device, thus, provides an essential part of a system which allows for current inventory control as well as for automated accounting procedures.

While one embodiment of this invention has been shown and described, it will be apparent that other adaptations and modifications can be made without departing from the true spirit and scope of the invention.

What is claimed is:

1. An optical readout device for use with an article of merchandise having a label provided with a number of information-containing regions thereon comprising: a support having an opening therethrough; a handle coupled with the support for moving the same into an operative position adjacent to an article of merchandise and for positioning the opening over a label on said article, the support having a bottom surface configured to engage an article of merchandise and to permit a label on the article to be at least partially received within said opening when said support is in said operative position; a reversible motor carried by the support and having a reciprocal member thereon movable in a plane substantially parallel with the plane of said opening; a light source, a number of photosensitive elements, each element adapted to generate an electronic signal as a function of the amount of light received thereby; means mounting the light source and said elements on said member for movement therewith; an electrical switch carried by said handle; means coupling said switch with said motor for selectively energizing the latter when the switch is actuated; and a light pipe unit including a plurality of light pipes, there being a pair of light pipes for each information-containing region of the label, respectively, a first end of each light pipe being adjacent to said opening and in proximity to the corresponding first end of the other light pipe of the corresponding pair, the opposite end of a first light pipe of each pair being coupled with a respective photosensitive element and the opposite end of the second light pipe of each pair being coupled with said light source, said first ends of the light pipes being movable transversely of said opening in scanning relationship to a label received therewithin, whereby light from said light source will be directed to the label through the second light pipes of said pairs and said first light pipes will receive light reflected from respective regions of the label and will direct said reflected light to respective photosensitive elements.

2. A device as set forth in claim 1, wherein said switch coupling means includes a limit switch in the path of said member and coupled with said motor for de-energizing the latter after the member has returned to its initial position.

3. A device as set forth in claim 1, werein the opening is disposed to permit viewing of the label to thereby facilitate the alignment of the opening and the label as the support is moved into said operative position.

4. A device as set forth in claim 1, wherein said support has a pair of relatively convergent edges defining a portion of the peripheral boundary of the opening, said edges being engageable with corresponding edges of a label to define guide means therefor to facilitate the positioning of the label within the opening.

5. A device as set forth in claim 1, wherein is included a label adapted to be affixed to an article of merchandise, said opening having an inner periphery substantially complemental to the outer periphery of the label.

References Cited

UNITED STATES PATENTS

| | | | |
|---|---|---|---|
| 2,410,104 | 10/1947 | Rainey | 250—227 |
| 2,669,354 | 2/1954 | Perrin | 250—227 X |
| 3,124,675 | 3/1964 | Epstein | 250—227 X |
| 3,173,018 | 3/1965 | Grim | 250—227 |
| 3,335,287 | 8/1967 | Hargens | 250—227 |
| 3,349,906 | 10/1967 | Calhoun et al. | 250—227 X |
| 3,430,057 | 2/1969 | Genahr | 250—227 |
| 3,436,757 | 4/1969 | Schwab | 250—227 X |

OTHER REFERENCES

Sokolski, Fiber Optic Read Head; IBM Technical Disclosure Bulletin; vol. 8, No. 6, November 1965; p. 879.

ROBERT SEGAL, Primary Examiner

U.S. Cl. X.R.

250—219, 224